(12) United States Patent
Fitzgerald et al.

(10) Patent No.: US 9,154,409 B2
(45) Date of Patent: Oct. 6, 2015

(54) METHOD FOR DEBUGGING PRIVATE VLAN

(71) Applicant: Avaya, Inc., Basking Ridge, NJ (US)

(72) Inventors: Deborah Ellen Fitzgerald, Acton, MA (US); Srikanth Keesara, Tewksbury, MA (US)

(73) Assignee: AVAYA INC., Basking Ridge, NJ (US)

( * ) Notice: Subject to any disclaimer, the term of this patent is extended or adjusted under 35 U.S.C. 154(b) by 178 days.

(21) Appl. No.: 13/904,671

(22) Filed: May 29, 2013

(65) Prior Publication Data
US 2014/0355409 A1 Dec. 4, 2014

(51) Int. Cl.
*H04L 12/28* (2006.01)
*H04L 12/703* (2013.01)
*H04L 12/707* (2013.01)

(52) U.S. Cl.
CPC .................. *H04L 45/28* (2013.01); *H04L 45/22* (2013.01)

(58) Field of Classification Search
CPC ....................................................... H04L 45/22
USPC .......................................................... 370/216
See application file for complete search history.

(56) References Cited

U.S. PATENT DOCUMENTS

| 8,767,587 | B1 * | 7/2014 | Finn et al. ..................... 370/255 |
| 8,798,059 | B1 * | 8/2014 | Kommula et al. ............. 370/392 |
| 2013/0051243 | A1 * | 2/2013 | Senthivel et al. ........... 370/241.1 |

OTHER PUBLICATIONS

HomChaudhuri et al; "RFC 5517—Cisco Systems' Private VLANs: Scalable Security in a Multi-Client Environment"; Feb. 2010; Cisco Systems; pp. 1-10.*

* cited by examiner

*Primary Examiner* — Christopher R Crompton
(74) *Attorney, Agent, or Firm* — Anderson Gorecki & Rouille LLP

(57) ABSTRACT

A method, apparatus and computer program product for debugging private Virtual Local Area Networks (VLANs) is provided. In a Connectivity Fault Management (CFM) domain wherein a primary Virtual Local Area Network (VLAN) includes promiscuous ports and wherein a secondary VLAN includes isolated ports, a determination is made at a first network device whether a CFM packet is received on a primary VLAN or a secondary VLAN. When the CFM packet is received on a secondary VLAN, then the CFM packet is responses to on the primary VLAN.

17 Claims, 3 Drawing Sheets

METHOD FOR DEBUGGING PRIVATE VLAN

BACKGROUND

Ethernet Connectivity Fault Management (CFM) is an end-to-end per-service-instance Ethernet layer protocol that includes proactive connectivity monitoring, fault verification, and fault isolation. CFM uses maintenance points. A maintenance point is a demarcation point on an interface (port) that participates in CFM within a maintenance domain. Maintenance points on device ports act as filters that confine CFM frames within the bounds of a domain by dropping frames that do not belong to the correct level. Two classes of maintenance points exist, Maintenance Endpoints (MEPs) and Maintenance Intermediate points (MIPs).

MEPS exist at a per-maintenance domain (level) and service provider VLAN (S-VLAN). MEPs at an edge of a domain define the domain boundary. MEPs within the bounds of a maintenance domain confine CFM messages. When configured to do so, MEPs proactively transmit CFM continuity check messages (CCMs). At the request of an administrator, MEPs transmit traceroute and loopback messages.

MIPs exist at a per maintenance domain (level) and for all S-VLANs enabled or allowed on a port. MIPS are internal to a domain, not at the boundary. CFM frames received from MEPs and other MIPs are cataloged and forwarded. CFM frames at a lower level are stopped and dropped. All CFM frames at a higher level are forwarded.

SUMMARY

Conventional mechanisms such as those explained above suffer from a variety of deficiencies. One such drawback is that troubleshooting conventional carrier networks offering Ethernet Layer 2 services is challenging. Customers contract with service providers for end-to-end Ethernet service and service providers may subcontract with operators to provide equipment and networks. Compared to enterprise networks, where Ethernet traditionally has been implemented, these constituent networks belong to distinct organizations or departments, are substantially larger and more complex, and have a wider user base. Ethernet CFM provides a competitive advantage to service providers for which the operational management of link uptime and timeliness in isolating and responding to failures is crucial to daily operations.

Embodiments of the invention significantly overcome such deficiencies and provide mechanisms and techniques that provide a method for debugging private VLAN.

In a particular embodiment of a method for debugging private VLAN the method includes determining at a first network device in a Connectivity Fault Management (CFM) domain wherein a primary Virtual Local Area Network (VLAN) includes promiscuous ports and wherein a secondary VLAN includes isolated ports, whether a CFM packet is received on a primary VLAN or a secondary VLAN. The method further includes when said CFM packet is received on a secondary VLAN, then responding to said CFM packet on said primary VLAN. The method further includes wherein when the CFM packet comprises an LTM packet received on a primary VLAN, then consulting the combined set of MAC addresses learnt on both VLANS for the propose of determining whether or not said first network device is in the path to the target. Additionally, a MIP as part of its link trace response would include additional TLV information to indicate if the target MAC was learnt on primary VLAN/secondary VLAN/ Promiscuous/isolated port. The standard implementation would not include this extra information.

Other embodiments include a computer readable medium having computer readable code thereon for debugging private VLAN. The computer readable medium includes instructions for determining at a first network device in a Connectivity Fault Management (CFM) domain wherein a primary Virtual Local Area Network (VLAN) includes promiscuous ports and wherein a secondary VLAN includes isolated ports, whether a CFM packet is received on a primary VLAN or a secondary VLAN. The computer readable medium further includes instructions wherein when said CFM packet is received on a secondary VLAN, then responding to said CFM packet on said primary VLAN. The computer readable medium further includes instructions wherein when the CFM packet comprises an LTM packet received on a primary VLAN, then consulting the combined set of MAC addresses learnt on both VLANS for the propose of determining whether or not said first network device is in the path to the target. Additionally, the computer readable medium includes instructions wherein for a MIP as part of its link trace response would include additional TLV information to indicate if the target MAC was learnt on primary VLAN/secondary VLAN/Promiscuous/isolated port.

Still other embodiments include a network device, configured to process all the method operations disclosed herein as embodiments of the invention. In such embodiments, the network device includes a memory system, a processor, communications interface in an interconnection mechanism connecting these components. The memory system is encoded with a process that provides for debugging private VLAN as explained herein that when performed (e.g. when executing) on the processor, operates as explained herein within the network device to perform all of the method embodiments and operations explained herein as embodiments of the invention. Thus any network device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method for debugging private VLANs as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
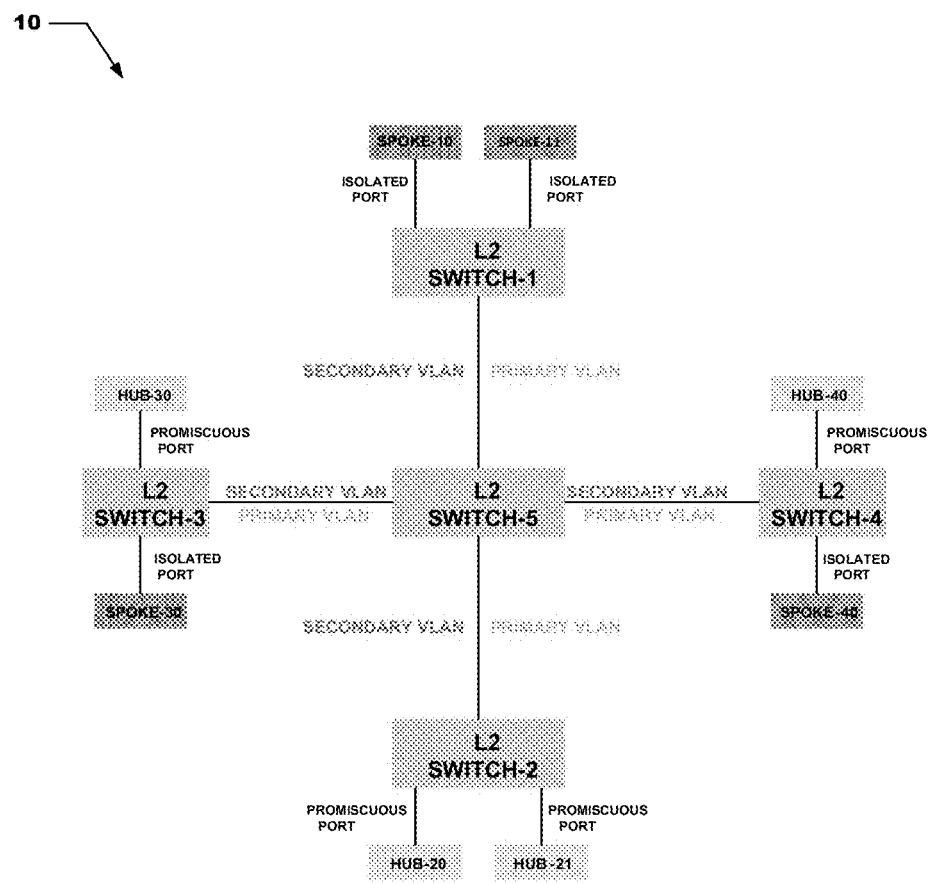
FIG. 1 comprises a block diagram of a network in accordance with embodiments of the invention.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The following definitions are used throughout the specification. A private VLAN is a Layer-2 service in the network where the access-points into the L2-service is either a promiscuous port or an isolated port as defined below. A promiscuous port is an access-point for a private VLAN that is allowed to communicate with all other access-points in the private VLAN. An isolated port is an access-point for a private VLAN that is not allowed to communicate with any other isolated port. An isolated port is only allowed to communicate with promiscuous ports in the private VLAN. A trunk port is a tagged port carrying private VLAN traffic between switches. A primary VLAN is the VLAN_ID used on trunk ports to carry traffic from promiscuous ports. A secondary VLAN is the VLAN_ID used on trunk ports to carry traffic from isolated ports.

Private VLANs are used in networking to provide isolation at Layer 2. The concept of Private VLANs is to provide isolation between ports within the same broadcast domain. In the Private VLAN solution, there are different types of ports specified: promiscuous, isolated, and community. A promiscuous port is allowed to communicate with all other access points in the in the private VLAN; this would include not only other promiscuous ports but also isolated and community ports. An isolated port is only allowed to communicate with promiscuous ports; it is not allowed to communicate with other isolated ports. Community ports can communicate with other community ports and with promiscuous ports there is no communication between community ports and isolated ports. Finally, trunk ports are tagged ports that carry private VLAN traffic between switches. Trunk ports can carry either the primary or secondary VLAN IEEE 802.1ag (a.k.a. CFM) defines the basic troubleshooting capabilities that should be supported by Ethernet based networking equipment. Key among these tools are the Loopback (LBM) and Linktrace (LTM) that were defined for verifying Layer-2 reachability and for tracing Layer-2 paths within the network. The standardization effort did not define the user of multiple VLANs for the same LBM or LTM operation. The standard did not define how to use CFM to debug, troubleshoot, and determine proper configuration for a private VLAN deployment.

A MEP can send a CFM packet called an LBM (loopback) specifically to another MEP or MIP. This acts like a ping. The packet only goes to specified recipient. The responder sends back an LBR (response). This lets the user debugging the system know that there is connectivity between these 2 devices. A MEP can also send a CFM packet called an LTM (linktrace) to another MEP or MIP. Any MIP on the path to the target will respond. Thus, the entire path from the sender to the receiver is learned (like traceroute).

The presently described invention utilizes a pair of VLANs specified for the private solution. The primary VLAN is the VLAN Identifier used on trunk ports to carry traffic from promiscuous ports. The secondary VLAN is the VLAN Identifier used on trunk ports to carry traffic from isolated ports. There is a one to one mapping between primary and secondary VLANs.

When the user configures a network, the user is required to specify the isolated and promiscuous ports for the private VLAN. Since the data traffic will use the primary VLAN or secondary VLAN depending on the configuration, the user must have an effective means to confirm that traffic is traversing as expected and the isolation required for security and other applications has been achieved. CFM allows the path between devices to be determined and it will allow the user not only to debug faults but also to determine whether the isolation model is correctly set-up.

In conventional systems, there is one VLAN associated with a MEP or MIP. The present invention requires that control packets sent from CFM (i.e. LBM and LTM) and packets received from CFM (LBR and LTR) could be sent or received on either VLAN in the private VLAN pair. The CFM datapath would ensure that the proper VLAN is passed to the protocol. The CFM protocol would know which VLAN is the primary VLAN and which VLAN is the secondary VLAN and would be able to give the user information as to whether a given response packet (i.e. LBR, LTR) was received on the primary or the secondary VLAN.

Referring now to FIG. 1, a network environment 10 is shown. A core switch, Switch 5 is shown in communication with each of Switches 1-4 by way of a respective primary VLAN and secondary VLAN for each switch. Switch 1 has two isolated ports and would communicate with Switch 5 via the secondary VLAN. Switch 2 has two promiscuous ports and would communicate with Switch 5 via the primary VLAN. Switch 3 has a promiscuous port and would communicate with Switch 5 via the primary VLAN. Switch 3 also has an isolated port and would communicate with Switch 5 via the secondary VLAN. Switch 4 has a promiscuous port and would communicate with Switch 5 via the primary VLAN. Switch 4 also has an isolated port and would communicate with Switch 5 via the secondary VLAN.

In conventional systems, a problem can occur when a trace request is performed. For example, a trace request packet is set by spoke 40 to Switch 4 via an isolated port. Switch 4 would then forward the trace request packet to Switch 5 on the secondary VLAN since the packet is from an isolated port. Switch 5 cannot send the response packet back to spoke 40 via secondary VLAN to Switch 4 isolated port so the response is dropped.

By way of the presently described method for debugging private VLANs, a trace request packet is set by spoke 40 to Switch 4 via an isolated port. Switch 4 would then forward the trace request packet to Switch 5 on the secondary VLAN since the packet is from an isolated port. Switch 5 would then send the response packet back to Switch 4 via primary VLAN, and from there to the isolated port to spoke 40. As part of the presently described method for debugging private VLAN, the forwarding table on Switch 5 includes a combination of primary VLAN information and secondary VLAN information and there is a one-to-one mapping between the primary VLAN and the secondary VLAN.

An additional feature of the presently described method for debugging private VLANs is that each LTM packet can contain data. Type Length Values (TLVs) are defined by the standard or the implementer can define an organizational specific TLV. An organizational specific TLV can contain information that the company wants to know about boxes along the way. The non-company devices will not fill this in but will ignore it. The company boxes can fill it in. The standard LTM has ingress and egress port info (like mac address etc.). It could be possible to pass along whether a given port is isolated or promiscuous in an organization specific TLV. When the packet comes back to the box that sent the LTM it will parse all the TLVs and response messages. The information will be formatted for the user. The user could then not only see if the links were up but also if the port is configured correctly. They could have left something promiscuous and really wanted isolated for security reasons etc.

Figure 2:
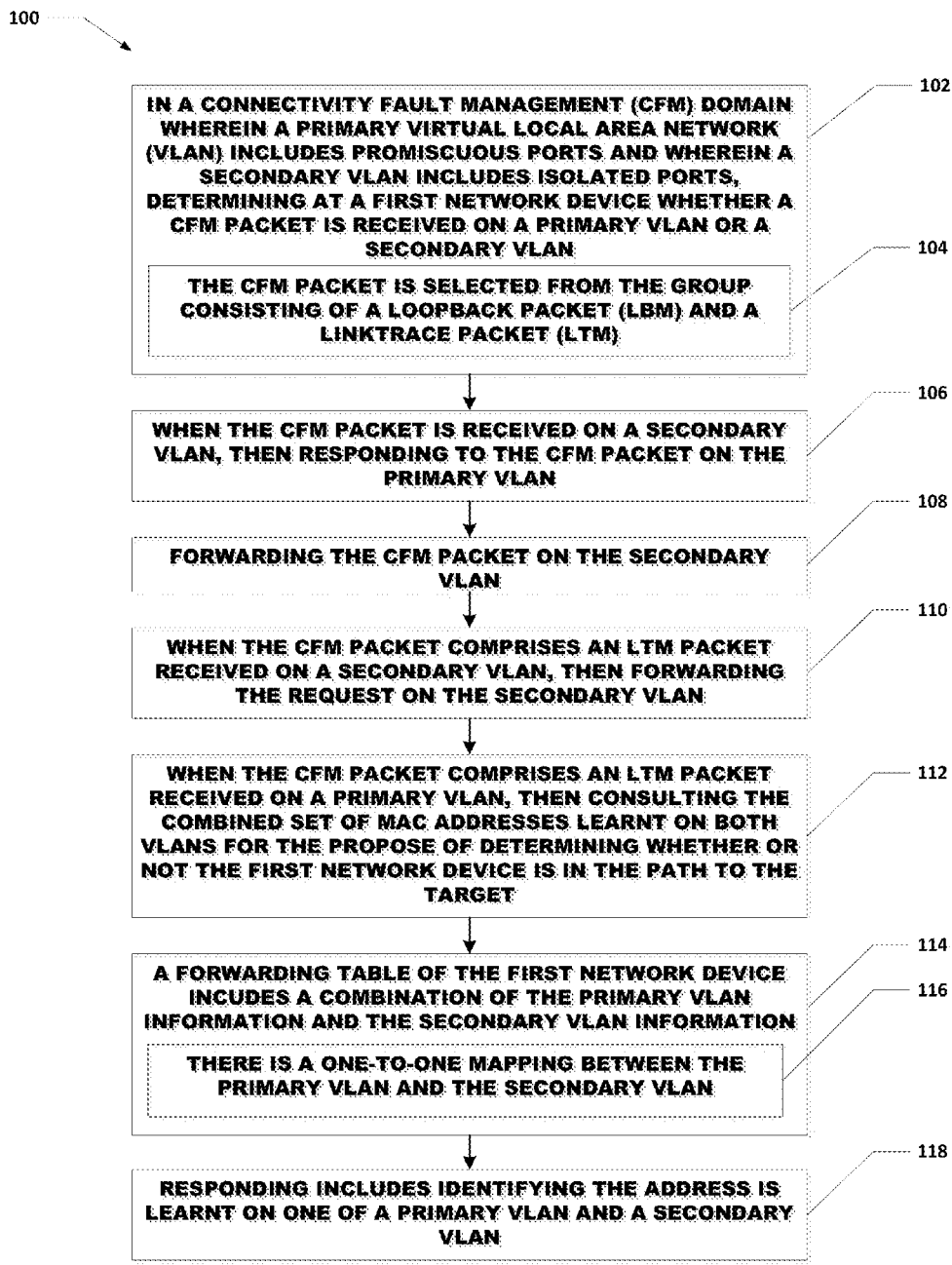
FIG. 2 comprises a flow diagram of a particular embodiment of a method for debugging private VLANs in accordance with embodiments of the invention.

A flow chart of the presently disclosed method is depicted in FIG. 2. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 2 a flow diagram of a particular embodiment of a method 100 for debugging a private VLAN is shown. Method 100 begins with processing block 102 which discloses in a Connectivity Fault Management (CFM) domain wherein a primary Virtual Local Area Network (VLAN) includes promiscuous ports and wherein a secondary VLAN includes isolated ports, determining at a first network device whether a CFM packet is received on a primary VLAN or a secondary VLAN. As shown in processing block 104, the CFM packet is selected from the group consisting of a Loopback Packet LBM and a Linktrace Packet (LTM). An LBM is sent specifically to another device and acts like a ping. The responder sends back and LBR. This is used to verify connectivity between two devices. An LTM is sent to another device and any device on the path to the target will respond. Thus, the entire path from the sender to the receiver is learned.

Processing block 106 states when the CFM packet is received on a secondary VLAN, then responding to the CFM packet on the primary VLAN. This is different than conventional systems. Processing block 108 recites forwarding the CFM packet on the secondary VLAN.

Processing block 110 discloses when the CFM packet comprises an LTM packet received on a secondary VLAN, then forwarding the request on the secondary VLAN. Processing block 112 states when the CFM packet comprises an LTM packet received on a primary VLAN, then consulting the combined set of MAC addresses learnt on both VLANS for the propose of determining whether or not the first network device is in the path to the target.

Processing block 114 recites a forwarding table of the first network device includes a combination of the primary VLAN information and the secondary VLAN information. As shown in processing block 116 there is a one-to-one mapping between the primary VLAN and the secondary VLAN.

Processing block 118 discloses the responding includes identifying the address is learnt on one of a primary VLAN and a secondary VLAN. This information allows the user to not only if the links are up, but also if the ports are configured correctly.

Figure 3:
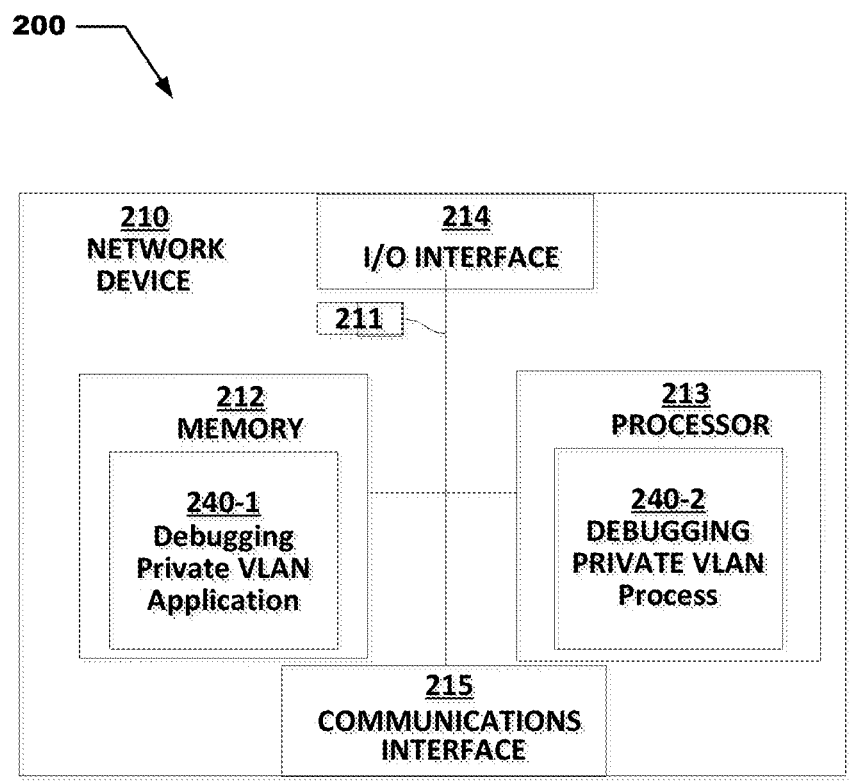
FIG. 3 illustrates an example computer system architecture for a computer system that performs a method for debugging private VLANs in accordance with embodiments of the invention.

FIG. 3 is a block diagram illustrating example architecture of a computer system 210 that executes, runs, interprets, operates or otherwise performs a debugging private VLAN operating application 240-1 and debugging private VLAN operating process 240-2 suitable for use in explaining example configurations disclosed herein. The computer system 210 may be any type of computerized device such as a personal computer, workstation, portable computing device, console, laptop, network terminal or the like. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a debugging private VLAN operating application 240-1 as explained herein. The debugging private VLAN operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a debugging private VLAN operating application 240-1. Execution of a debugging private VLAN operating application 240-1 in this manner produces processing functionality in the debugging private VLAN operating process 240-2. In other words, the debugging private VLAN operating process 240-2 represents one or more portions or runtime instances of a debugging private VLAN operating application 240-1 (or the entire debugging private VLAN operating application 240-1) performing or executing within or upon the processor 213 in the computerized device 210 at runtime.

It is noted that example configurations disclosed herein include the debugging private VLAN operating application 240-1 itself (i.e., in the form of un-executed or non-performing logic instructions and/or data). The debugging private VLAN operating application 240-1 may be stored on a computer readable medium (such as a floppy disk), hard disk, electronic, magnetic, optical, or other computer readable medium. A debugging private VLAN operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a debugging private VLAN operating application 240-1 in the processor 213 as the debugging private VLAN operating process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the debugging private VLAN application 240-1. Execution of debugging private VLAN application 240-1 produces processing functionality in debugging private VLAN process 240-2. In other words, the debugging private VLAN process 240-2 represents one or more portions of the debugging private VLAN application 240-1 (or the entire application) performing within or upon the processor 213 in the computer system 200.

It should be noted that, in addition to the debugging private VLAN process 240-2, embodiments herein include the debugging private VLAN application 240-1 itself (i.e., the un-executed or non-performing logic instructions and/or data). The debugging private VLAN application 240-1 can be stored on a computer readable medium such as a floppy disk, hard disk, or optical medium. The debugging private VLAN application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of debugging private VLAN application 240-1 in processor 213 as the debugging private VLAN process 240-2. Those skilled in the art will understand that the computer system 200 can include other processes and/or software and hardware components, such as an operating system that controls allocation and use of hardware resources associated with the computer system 200.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
in a Connectivity Fault Management (CFM) domain wherein a primary Virtual Local Area Network (VLAN) includes promiscuous ports and wherein a secondary VLAN includes isolated ports, determining at a first network device whether a CFM packet is received on a primary VLAN or a secondary VLAN; and
when said CFM packet is received on a secondary VLAN, then responding to said CFM packet on said primary VLAN.

2. The method of claim 1 further comprising forwarding said CFM packet on said secondary VLAN.

3. The method of claim 1 wherein said CFM packet is selected from the group consisting of a Loopback Packet (LBM) and a Linktrace Packet (LTM).

4. The method of claim 3 wherein when said CFM packet comprises an LTM packet received on a secondary VLAN, then forwarding said request on said secondary VLAN.

5. The method of claim 3 wherein when said CFM packet comprises an LTM packet received on a primary VLAN, then consulting a combined set of MAC addresses learnt on both VLANS for the purpose of determining whether or not said first network device is in the path to the target.

6. The method of claim 5 wherein a forwarding table of said first network device includes a combination of said primary VLAN information and said secondary VLAN information.

7. The method of claim 1 wherein said responding includes identifying said address is learnt on one of a primary VLAN and a secondary VLAN.

8. A non-transitory computer readable storage medium having computer readable code thereon for debugging private Virtual Local Area Networks (VLANs,) the medium including instructions in which a computer system performs operations comprising:
in a Connectivity Fault Management (CFM) domain wherein a primary Virtual Local Area Network (VLAN) includes promiscuous ports and wherein a secondary VLAN includes isolated ports, determining at a first network device whether a CFM packet is received on a primary VLAN or a secondary VLAN; and
when said CFM packet is received on a secondary VLAN, then responding to said CFM packet on said primary VLAN.

9. The computer readable storage medium of claim 8 further comprising forwarding said CFM packet on said secondary VLAN.

10. The computer readable storage medium of claim 8 wherein said CFM packet is selected from the group consisting of a Loopback Packet (LBM) and a Linktrace Packet (LTM).

11. The computer readable storage medium of claim 10 wherein when said CFM packet comprises an LTM packet received on a secondary VLAN, then forwarding said request on said secondary VLAN.

12. The computer readable storage medium of claim 10 wherein when said CFM packet comprises an LTM packet received on a primary VLAN, then consulting a combined set of MAC addresses learnt on both VLANS for the purpose of determining whether or not said first network device is in the path to the target.

13. The computer readable storage medium of claim 12 wherein a forwarding table of said first network device includes a combination of said primary VLAN information and said secondary VLAN information.

14. The computer readable storage medium of claim 8 wherein said responding includes identifying said address is learnt on one of a primary VLAN and a secondary VLAN.

15. A network device comprising:
a memory;
a processor;
a communications interface;
an interconnection mechanism coupling the memory, the processor and the communications interface; and
wherein the memory is encoded with an application for debugging private Virtual Local Area Networks (VLANs), that when performed on the processor, provides a process for processing information, the process causing the network device to perform the operations of:
in a Connectivity Fault Management (CFM) domain wherein a primary Virtual Local Area Network (VLAN) includes promiscuous ports and wherein a secondary VLAN includes isolated ports, determining at a first network device whether a CFM packet is received on a primary VLAN or a secondary VLAN; and
when said CFM packet is received on a secondary VLAN, then responding to said CFM packet on said primary VLAN.

16. The network device of claim 15 further comprising forwarding said CFM packet on said secondary VLAN, and wherein said CFM packet is selected from the group consisting of a Loopback Packet (LBM) and a Linktrace Packet (LTM).

17. The network device of claim 16 wherein when said CFM packet comprises an LTM packet received on a secondary VLAN, then forwarding said request on said secondary VLAN, and wherein when said CFM packet comprises an LTM packet received on a primary VLAN, then consulting a combined set of MAC addresses learnt on both VLANS for the purpose of determining whether or not said first network device is in the path to the target.

* * * * *